United States Patent Office 2,966,413
Patented Dec. 27, 1960

2,966,413

STABILIZATION OF FATS AND OILS

Stephen S. Chang, Park Forest, and Patrick E. Mone, Oak Lawn, Ill., assignors to Swift & Company, Chicago, Ill., a corporation of Illinois No Drawing. Filed Apr. 24, 1957, Ser. No. 654,674

9 Claims. (Cl. 99—163)

This invention relates in general to edible fatty materials and more particularly to the stabilization of edible glycerides against heat-induced deterioration.

Edible fatty materials used for commercial deep-fat frying include both those fats which are normally liquid at room temperature and those which are solid at room temperature, such as the plastic shortenings and margarine, for instance. Cooking oils are known to undergo changes upon treatment at elevated temperatures for long periods of time. These changes include an increase in viscosity, a darkening in color and the formation of gums and other polymeric materials. Linoleic acid content and nutritive value of the oil are also decreased by prolonged heating. While antioxidants such as butylated hydroxyanisole, propyl-gallate, etc., have been employed to improve the oxidative stability and flavor stability of edible fats and oils, these antioxidants have little or no effect on the darkening and polymerization of oils or the loss in nutritive value of the oil during prolonged heating. Moreover, many of these antioxidants, particularly naturally-occurring antioxidants such as tocopherols, become substantially less effective or even inactive when subjected to elevated temperatures.

It is, therefore, an object of this invention to provide a method for inhibiting the heat-induced deterioration of cooking fats.

Another object of this invention is to provide fatty materials having an improved resistance to heat-induced losses in nutritional value and color deterioration.

Other objects, if not specifically set forth herein, will be readily apparent to one skilled in the art from the following detailed description of the invention.

In accordance with the present invention, it has been found that the addition of a relatively small amount of naturally-occurring sitosterols to a cooking fat provides the fat with improved resistance to darkening and viscosity increases upon prolonged treatment at elevated temperatures. Moreover, the nutritive value of the fat is maintained at a high value. The sitosterol or sitosterol-containing material is simply added to the cooking fat after it has been refined and deodorized.

More specifically, it is within the contemplation of this invention to add to a fat having shortening properties and which may find use in the frying of potato chips, nuts, doughnuts, etc., a small amount of alpha sitosterols. As used herein, the term "alpha sitosterol" is intended to denote all of the steric isomers of alpha sitosterol derived from such plant materials as corn oil, wheat germ oil, rye germ oil, and Milo and Kaffir corn oil.

The amount of alpha sitosterol which is employed to achieve the aforementioned beneficial results is about .001% to 2%, based on the weight of the fat to which it is added. While larger amounts may be employed, the increased stability imparted by these larger amounts is not commensurate with the amount added, and, therefore, there is little advantage in adding amounts in excess of about 2%. An alpha sitosterol fraction suitable for use in accordance with the present invention may be obtained from corn oil in accordance with the following procedure.

EXAMPLE I

A charge of corn oil (5600 grams) was deodorized by steam distillation at a temperature above about 160° C. under a vacuum of 0.05 mm. Hg. The volatile fraction from this deodorization was collected in a trap cooled with Dry Ice and acetone. This steam-volatile overhead fraction was then extracted with ethyl ether, the residue after removal of the ether weighing 29 grams. The residue was then taken up in additional ether, and the ether solution was extracted with 5% aqueous sodium hydroxide solution to remove acidic materials. The acid-free extract was washed with water, and the solvent was then removed. The residue was dissolved in boiling methanol. Upon cooling of the methanol solution, white needles precipitated. The precipitate was recrystallized several times from acetone and several times from methanol to yield a crop of white, shining crystals of alpha sitosterol-containing crystals. A similar active sitosterol mixture may be obtained from wheat germ oil in accordance with this procedure.

In order to show the effect which alpha sitosterols have on the stability of cooking oils, several samples of winterized cottonseed oil to which alpha sitosterol fractions had been added were compared to a winterized cottonseed oil sample containing no additive under conditions of heating at elevated temperatures for a long period of time. Specifically, the oil samples were heated in deep-fat fryers at 179–181° C. for 144 hours. In the table which follows, analytical data showing the physical condition of each of the oils after this prolonged heating period is set forth.

Table 1

| Glyceride Material | Viscosity (Saybolt 210° F.) | Lovibond Color (Red) | Linoleic Acid (Percent) |
|---|---|---|---|
| A. Winterized Refined Cottonseed Oil | 237 | 52.0 | 18.7 |
| B. Composition A plus 0.5% steam-volatile fraction of corn oil | 71 | 15.4 | 34.0 |
| C. Composition A plus 0.05% sitosterol fraction of corn oil | 71 | 13.0 | 40.4 |
| D. Composition A plus 0.02% sitosterol fraction of corn oil | 73 | 10.8 | 33.9 |
| E. Composition A (not heated) | 63 | 5.5 | 42.0 |

It is evident from the data for linoleic acid content in each case in those samples containing the additives of this invention that very little of the linoleic acid present in the oil is lost. A noticeable decrease in linoleic acid content as exemplified by Sample A can be correlated with the increase in viscosity and poor color shown for that sample.

The resistance imparted by the additives of this invention against the heat-induced losses in nutritive value and changes in biological properties of oils and shortenings is given in the following example:

EXAMPLE II

The stabilizing effect of alpha sitosterol on the nutritive value of cooking oils heated in deep-fat fryers at 179–181° C. for 120–144 hours was determined in a one-week rat feeding experiment. The procedure is known as "Caloric Restriction Technique." The technique is described in a publication by E. E. Rice et al. in The Journal of Nutrition, vol. 61, pp. 253–266. The rats are fed a restricted amount of a basal diet plus a measured amount of the material being tested. In the test from which the data set forth in Table 2 was derived, fresh winterized cottonseed oil containing varying amounts of the additives of this invention was added to a basal diet. Each of the compositions A through F was fed to a group of four rats. Each rat within the group received 5 grams of the basal diet plus 1.5 grams of the fat supplement. An accurate determination of the available calories of each fat supplement was made. The prime steam lard value is the amount of prime steam lard in grams required per rat per day to produce the same weight gain as that provided by the substance being tested. The prime steam lard equivalent is obtained from the following formula:

Percent prime steam lard equivalent
$$= \frac{\text{prime steam lard value}}{\text{amount of fat fed}} \times 100$$

At the conclusion of the feeding test, the animals were anesthetized with chloroform and the livers were removed for weighing. The data is set forth in Table 2 which follows:

Table 2

| Fat Supplement To Basal | Percent Prime Steam Lard Equivalent | Wt. Gain (avg. in 7 days, gms.) | Liver Wt. (as percent body wt.) |
| --- | --- | --- | --- |
| A. Fresh winterized cottonseed oil | 97 | 31.3 | 4.59 |
| B. Composition A, used for frying potato chips at 180° C. for 120 hours | 56 | 24.8 | 6.73 |
| C. Composition A plus 0.02% sitosterols of corn oil, used for frying potato chips at 180° C. for 120 hours | 79 | 28.8 | 5.67 |
| D. Composition A, heated at 180° C. for 6 days | 32 | 20 | 6.75 |
| E. Composition A plus 0.02% sitosterols of corn oil heated at 180° C. for 6 days | 83 | 29.3 | 6.20 |
| F. Composition A plus 5% by weight of the oil extract of wheat germ meal, heated at 180° C. for 6 days | 100 | 31.8 | 4.91 |

It is apparent that those oils which are merely heated differ in nutritional value from those which are employed in cooking foodstuffs.

It has, of course, been recognized previously that glyceride oils undergo some oxidation and heat polymerization upon being treated at an elevated temperature for an extended period of time. The degree to which the oil is polymerized may be measured in terms of viscosity since viscosity increases follow the progress of polymerization. The effect which the alpha sitosterols have on the glyceride material to which they have been added appears to be one of inhibiting polymerization. Antioxidants may also be used in the glyceride material to protect against oxidation of the oil, and although these antioxidants are quite effective in inhibiting initial oxidation, they have little or no effect upon heat-induced thickening of the fatty material.

EXAMPLE III

In order to demonstrate the lack of effectiveness in inhibiting color deterioration, viscosity increases and increases in linoleic acid content provided by known fat antioxidants, winterized refined cottonseed oil, to which no additive had been added, was compared to samples of the same cottonseed oil to which a natural antioxidant had been added and a further sample of the same cottonseed oil sample to which a synthetic antioxidant had been added. All of the samples were heated to 179–181° C. for 144 hours. Physical data for each of the samples is set forth in Table 3.

Table 3

| | Viscosity (Saybolt 210° F.) | Lovibond Color (Red) | Linoleic Acid (Percent) |
| --- | --- | --- | --- |
| A. Winterized cottonseed Oil | 149 | 30 | 23.8 |
| B. Composition A plus 0.05% of Commercial Antioxidant [1] | 175 | 57 | 22.9 |
| C. Composition A plus 0.05% tocopherols | 170 | 76 | 25.0 |
| D. Composition A plus 0.01% sitosterols derived from Corn Oil | 72 | 10.8 | 33.9 |

[1] 20% butylated hydroxyanisole; 70% propylene glycol; 6% propyl gallate; 4% citric acid.

A further modification of this invention is an improved means whereby the alpha sitosterols may be very efficiently incorporated in the fatty material which they are intended to fortify. In accordance with this modification, wheat germ, which is an alpha sitosterol containing vegetable material, is extracted with the fatty material to which it is to be added and the fat-soluble alpha sitosterols are thereby incorporated in the fatty material. The following illustrative example shows a typical extraction procedure embodying this modification of the invention:

EXAMPLE IV

Commercial wheat germ (20 pounds) containing about 10% moisture is extracted with about 400 pounds of a typical vegetable oil such as soybean oil, cottonseed oil, or hydrogenated vegetable oil by mixing in a tank or by recycling the mixture through a frame filter press. The extraction is carried out for a period of 5 minutes or more at a temperature generally above about 60° C. After filtering and deodorizing, the concentrated oil extract may then be added to the edible fatty material in the desired concentration.

The alpha sitosterols may also be derived from the "foots" obtained in refining vegetable oils containing these alpha sitosterols. "Foots" is a term well known in the art as that material which settles out as the soaps and sludge in the alkali refining of these fatty materials. This material generally contains, in addition to the soapstock, such components as pigments, phosphatides, phytosterols, etc. It is possible to obtain an alpha sitosterol fraction from such foots by first acidulating and then extracting the acidulated foots with methanol. The methanol solution of alpha sitosterols is then cooled and a crystalline alpha sitosterol fraction precipitates. After one or two recrystallizations from methanol, the concentrated additive may be used in the practice of the present invention.

Since beta sitosterol is often present along with alpha sitosterol in phytosterol-containing vegetable materials, experiments were conducted in order to compare the effectiveness of beta sitosterol to alpha sitosterol as a polymerization-inhibiting agent, as follows:

EXAMPLE V

Winterized cottonseed oil samples to which the additives of this invention had been added were compared with a sample of winterized cotton seed oil to which beta sitosterol had been added and a control sample containing no additive. All samples were heated at 179–181° C. for 144 hours in an open container. The following tabulated data shows the physical consistency of the oils after this extended heating period:

Table 4

| Glyceride Material | Viscosity (Saybolt 210° F.) | Lovibond Color (Red) | Linoleic Acid (Percent) |
|---|---|---|---|
| A. Winterized cottonseed oil | 237 | 52.0 | 18.7 |
| B. Composition A plus 0.02% sitosterols derived from corn oil | 72 | 10.8 | 33.9 |
| C. Composition A plus 0.05% B sitosterol derived from tall oil | 125 | 19.2 | |
| D. Composition A plus 0.03% sitosterols derived from wheat germ oil | 75 | 15.0 | 36.1 |
| E. Composition A containing sitosterols extracted from 5% by weight of the oil of wheat germ | 69 | 14 | 33.8 |
| F. Composition A plus 0.1% sitosterols derived from soybean oil | 238 | 50.5 | 21.0 |

It can thus be seen that the effect of the beta sitosterol on inhibiting polymerization is minimal.

A significant advantage inherent in the fatty materials treated in accordance with the method of this invention resides in the reduced tendency which these fatty materials have to foam after extended use in the deep-fat frying of such materials as potatoes, doughnuts, etc. Those cooking fats not containing the additive of this invention foam excessively after as little as three days' use in frying potato chips. Moreover, commercial antioxidants have little or no effect on this tendency of the oils to develop foam. The alpha sitosterol additive of the present invention, on the other hand, appears to provide a very definite defoaming action in the facts to which it is added.

Because the alpha sitosterol additives of this invention are entirely compatible with other agents which may be incorporated in shortening such as emulsifiers, antioxidants, and other stabilizers, the additive may be incorporated in any glyceride product likely to be subjected to high temperatures such as in the case of cooking oils.

Among those food products which may desirably be treated in accordance with this invention are edible animal and vegetable fats such as lard, salad oils, cooking oils, shortening, and margine. Shortenings of both the all-hydrogenated type and the compound or blended type, conaining both animal and vegetable fats, may be treated in accordance with this invention.

Athough the additives of this invention may be incorporated directly in a liquid fatty material or in a melted plastic shortening, it is desirable to incorporate the oil extract of the additive in the fatty product in the manner previously set forth.

Obviously, many modifications and variations of the invention as hereinbefor set forth may be made without departing from the spirit and scope thereof, and, therefore, only such limitations should be imposed as are indicated in the appended claims.

We claim:

1. A shortening product protected against the development of heat-induced polymerization product upon prolonged exposure to elevated cooking temperatures, which comprises: a fatty material having shortening properties containing about .001% to 2% based on the weight of the fatty material of alpha sitosterols.

2. A heat stabilized edible fatty material having a prolonged cooking life at elevated cooking temperatures containing as a major ingredient a refined deodorized glyceride material and as a minor ingredient about .001% to 2% added alpha sitosterols.

3. A cooking oil normally subject to heat-induced viscosity increases and color deterioration at elevated cooking temperatures, stabilized against such heat-induced changes, by a small amount of added alpha sitosterols concentrate.

4. A method of protecting a glyceride oil against darkening in color, nutritional losses and increases in viscosity upon prolonged heating at elevated cooking temperatures which comprises: adding to said glyceride oil at least about .001% of alpha sitosterols.

5. A method of protecting a glyceride material against heat-induced color deterioration, loss in nutritive value and viscosity increases which comprises: incorporating therein at least about .001% based on the weight of said oil of alpha sitosterols.

6. A method for extending the life of a cooking fat, which normally tends to polymerize and deteriorate in color upon prolonged heating at elevated cooking temperatures, which comprises: adding to said cooking fat about .001% to 2.0% of alpha sitosterols.

7. A method for extending the life of a cooking fat, which normally tends to polymerize and deteriorate in color upon prolonged heating at elevated cooking temperatures, which comprises: adding to said cooking fat the steam-volatile fraction obtained by deodorizing an alpha sitosterol containing oil under subatmospheric pressure and a temperature at least 160° C. for about 2 or more hours.

8. A method of protecting a glyceride material against heat induced color deterioration, loss in nutritive value and viscosity increases which comprises extracting wheat germ with a vegetable oil to provide an oil extract of alpha sitosterols and adding said oil extract of alpha sitosterols to an additional quantity of said vegetable oil and admixing to provide at least about .001% alpha sitosterols in the blended vegetable oil mixture.

9. A method of producing an improved edible fatty composition stabilized against heat induced viscosity increases which comprises acidulating foots obtained from the alkali refining of an alpha sitosterol containing oil; extracting said acidulated foots with methanol to provide a methanol solution of alpha sitosterols and incorporating the alpha sitosterols thus obtained in an edible fat.

References Cited in the file of this patent

UNITED STATES PATENTS 2,014,235    Lowry _____ Sept. 10, 1935

OTHER REFERENCES

Lips et al.: Oil and Soap, October 1943, pp. 193–196.